Patented Aug. 2, 1949

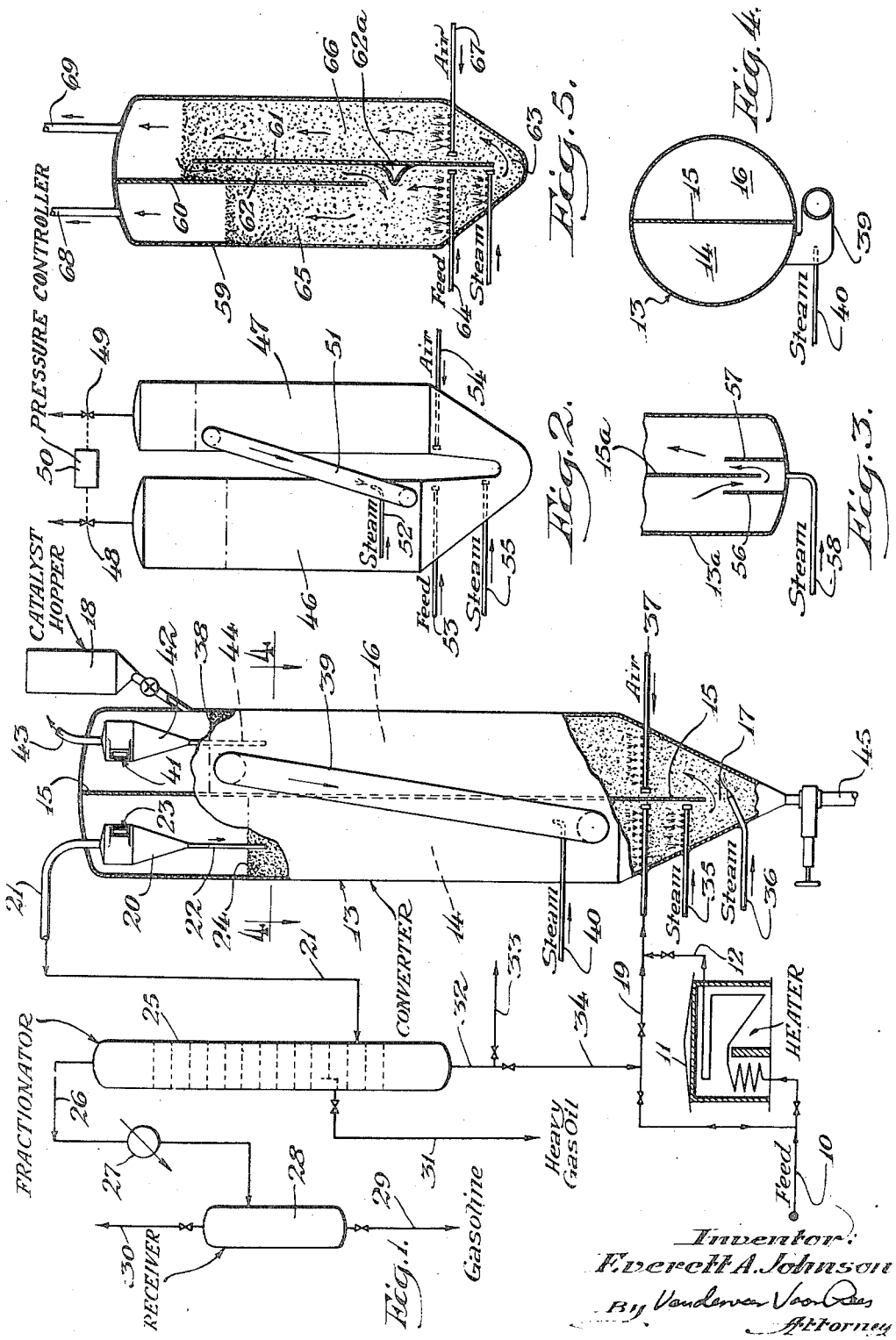

2,477,750

UNITED STATES PATENT OFFICE 2,477,750

CONVERSION OF HYDROCARBONS WITH SUSPENDED CATALYST

Everett A. Johnson, Park Ridge, Ill., assignor to Standard Oil Company, Chicago, Ill., a corporation of Indiana Application January 23, 1942, Serial No. 427,947

6 Claims. (Cl. 196—52)

This invention relates to the conversion of hydrocarbon oils by the action of catalysts and more particularly to the cracking of heavy hydrocarbons to produce gasoline of high knock rating by contacting the vapors of said heavy hydrocarbons with suspended subdivided solid catalysts. Still more particularly the invention relates to a combination process and an apparatus in which the catalyst is continuously regenerated in a regeneration zone and recycled to the reaction zone where it contacts further quantities of the hydrocarbon. Apparatus described herein is claimed in my continuation-in-part application S. N. 602,240, filed June 29, 1945. Related applications include Page S. N. 376,763, filed January 31, 1941; Johnson S. N. 392,846-7, filed May 10, 1941; Scheineman S. N. 392,848, filed May 10, 1941; Scheineman S. N. 400,956, filed July 3, 1941; Gunness S. N. 400,958, filed July 3, 1941, and Scheineman S. N. 440,566, filed April 27, 1942.

One object of the invention is to effect simultaneous regeneration of catalyst in a regeneration zone closely adjacent or contiguous to the reaction zone, thereby simplifying the problem of transferring catalyst in the system. Another object of the invention is to increase the rate of recycling the catalyst in a reactor-regenerator system by shortening the path through which the catalyst is required to travel. Still another object of the invention is to effect the circulation of catalyst in a reactor-regenerator system employing suspended powdered catalyst by controlling the density of the catalyst and maintaining a pseudohydrostatic balance of pressures between the reactor and the regenerator. A further object is to provide a hydrocarbon conversion process for conversion of the so-called dirty residual stocks difficult to process by the catalytic conversion processes of the prior art. A still further object of my invention is to provide a process and apparatus in which the heat required for the conversion reaction is derived in part or entirely from the regeneration of the catalyst by oxidation of carbonaceous matter deposited thereon. Other objects of the invention will be apparent from the following description thereof.

The invention is illustrated by a drawing in which Figure 1 is a flow diagram of my process employing a unitary regenerator-reactor. Figure 2 is a modified form of regenerator-reactor in which separate vessels are employed. Figure 3 is a detail of a seal which may be employed to conduct the catalyst between the reactor and the regenerator shown in Figure 1. Figure 4 is a cross section on line 4—4 through the converter of Figure 1 and Figure 5 is another modified form of converter.

My process is adapted to the conversion of hydrocarbons generally including the cracking of heavy oils to gasoline and reforming of light fractions, heavy naphtha, etc. into gasoline of high knock rating. The process is generally applicable to the cracking of heavy oils, gas oil, and residual stocks which may be charged to the reactor in the form of vapor or directly in the form of liquid sprayed into the reactor in direct contact with the catalyst. When charging feed stock directly to the reactor, I avoid any undesirable thermal cracking occurring in the step commonly employed in the prior art processes of preheating feed to conversion temperature in the absence of catalyst.

The catalyst which I employ is generally of a siliceous type such as the activated clays, acid activated montmorillonite clay, fuller's earth, etc. Various synthetic catalysts may be employed such as the metal oxides, generally an intimate mixture of two or more metal oxides such as silica, alumina, magnesia, zirconia, beryllia, thoria, etc. Aluminum fluoride may be admixed with the foregoing. A composition comprising from 2 to 40% of magnesia and/or alumina, with active silica, e. g., silica gel, making up the balance is an effective cracking catalyst. For reforming operations, I prefer to use magnesia or alumina promoted with oxides of the V and VI group metals such as vanadia, chromia, or molybdena.

The catalyst should be in the form of a powder or fine granules which may be suspended in the hydrocarbon vapors undergoing treatment. A particle size of 10 mesh to 400 mesh is satisfactory and usually I prefer a catalyst having a particle size within the range of about 100 to 300 mesh.

Referring to Figure 1 the feed stock, for example, a Mid-Continent gas oil of 35° A. P. I. gravity, may be charged by line 10 to heater 11 and thence by transfer line 12 to the converter 13, more specifically to the reaction zone 14 within the converter. The converter 13 is divided by a baffle plate 15 into a vertical reaction zone 14 and a regeneration zone 16, the division plate 15 completely separating the two zones except for an area or passage 17 at the bottom through which catalyst flows from one zone to the other. The catalyst may be charged to the system in suspension in the feed stock or through catalyst supply hopper 18.

The temperature of the reactor 14 may be suitably within the range of about 800 to 1100° F., generally about 925 to 1000° F. and the feed stock may be charged to the reactor superheated to the temperature of operation. However, since excess heat is available for the reactor from the regeneration of catalyst, as will be hereinafter explained, I may charge the liquid feed oil directly to the reactor without vaporization or with only a moderate preheating. By-pass line 19 around furnace 11 is provided for this purpose.

The catalyst within reactor 14 is preferably maintained in a dense suspension by regulating the velocity of the vapors passing upwardly therethrough. The catalyst concentration in this suspension may be about 2 to 25 pounds of catalyst per cubic foot more or less, depending on the catalyst and the type of operation employed. In general, the density of the catalyst suspension in the reactor is within the range of 5 to 15 pounds per cubic foot. The term "suspension" is used herein to indicate a dispersion of catalyst particles in a gas or vapor in which the particles have freedom of independent movement. The hydrocarbon vapors are brought into intimate contact with the catalyst and sufficient volume and catalyst are provided in reactor 14 to give the desired time of contact for conversion of the oil into gasoline. The amount of oil so converted in a single pass is usually about 10 to 60%, a conversion of 25 to 50% being typical.

The conversion products pass upward through the reaction zone, leaving a deposit of carbonaceous matter on the catalyst. The vaporous products leave the reactor through the catalyst separator 20 which may be a cyclone separator discharging vapor substantially free of catalyst by line 21 and returning recovered catalyst to the reaction zone by line 22. The space 23 at the top of the reactor may form a settling zone in which most of the catalyst is settled by gravity from the upflowing vapors and the catalyst may form a definite interface as indicated by line 24.

The product vapors are conducted by line 21 to fractionator 25 where a heavy fraction (or fractions) is separated and thence by line 26 to condenser 27 and receiver 28 from which gasoline products may be withdrawn by line 29 while fixed gases are discarded by line 30. The heavy gas oil fraction may be withdrawn from the column 25 by trapout line 31, thereby providing a limited amount of a still heavier fraction to be withdrawn from the bottom of the fractionator 25 by line 32. This fraction may contain some very finely divided catalyst carried over from the reactor in the product vapors. If desired, all products heavier than gasoline may be withdrawn by line 32. The material withdrawn may be discarded from the system by line 33 or recycled by line 34 to the reactor, either through line 19 or through heater 11.

To prevent excessive loss of catalyst activity a portion of the catalyst which settles to the bottom of reactor 14 flows continuously or intermittently through the passage 17 below the baffle 15 into the regenerator 16 where it is contacted with air or other oxygenous gas which chemically removes the carbonaceous matter from the catalyst. A stream of steam or inert gas may be introduced by line 35 placed below the feed inlet from transfer line 12. This steam serves to displace or strip from the catalyst any hydrocarbon vapors associated therewith and also assists in maintaining the catalyst in aerated, free-flowing condition. The flow of catalyst into the regenerator 16 may be facilitated by injecting additional steam through jet 36 as indicated. As the catalyst enters the regenerator 16, it is brought in contact with a current of air or other oxygenous gas introduced by line 37. The catalyst is maintained in suspension in the regenerator 16 and builds up a level which may be substantially above the level of catalyst in the reactor 14, the interface between the catalyst and vapor space at the top of 16 being indicated by 38. In normal operation the temperature in the regenerator 16 will be above the temperature in reactor 14 owing to the exothermic heat from the regeneration reaction in which carbon is burned from the surface of the catalyst. The increase in regenerator temperature in my process, however, is small because the relatively high rate of catalyst recycle tends to effect temperature equalization throughout the converter. The regenerator temperature may also be controlled by cooling in various ways, as for example, by means of cooling coils or by withdrawing a portion of the catalyst to a cooler and returning the cooled catalyst to the regenerator. Regenerator temperatures should ordinarily not exceed 1000 to 1200° F. with most catalysts, otherwise the catalyst activity becomes impaired.

A duct 39 is provided for carrying catalyst from the upper level in 16 to a low point in 14. The density of the catalyst-gas mixture in 16 will usually be maintained at a lower value than the density of the catalyst-gas mixture in the reactor 14, although this is not an essential condition and may also be reversed. As a result, the catalyst in 16 rises to a sufficiently high level to flow into the downcomer or standpipe 39. Within 39 the density of the catalyst-gas mixture still further increases owing to the lack of turbulence. However, the density within 39 may be controlled, if desired, by introducing steam or other gas at 40. The steam so introduced serves to sweep regeneration products from the catalyst back into the regenerator thereby avoiding oxidation of the hydrocarbon products in 14.

Typical density conditions are the following:

| | Pounds per cubic foot |
|---|---|
| Reactor 14 | 12 |
| Regenerator 16 | 10 |
| Standpipe 39 | 18 to 30 |

The spent regeneration gases now substantially free of oxygen are separated from catalyst in quiescent zone 41 and thence flow through cyclone 42 into discharge line 43 which eliminates the waste gases from the system. Recovered catalyst from cyclone 42 is returned to the regenerator by dip leg 44 which, if desired, may return regenerated catalyst directly to the standpipe 39. When desired, spent or partially exhausted catalyst may be withdrawn from the system by line 45 and replaced by new catalyst.

Instead of being a single vessel, the reactor and regenerator of Figure 1 may be two separate vessels as shown in Figure 2, a short connection at the bottom providing for crossflow of catalyst from one vessel to the other with a minimum of resistance. Reactor 46 may be of larger cross section than 47, if desired, thereby providing for a lower vapor velocity and a higher catalyst density, with the same rates of vapor and gas flow. However, this is a matter of design, and will depend on the amount of regeneration gas and other factors. If desired, some regeneration gas may be recycled to increase the flow through the regenerator and reduce density.

It is desirable that resistance to flow imposed on the catalyst in passing from one vessel to the other be very small in order to obtain high catalyst circulation rates with only a slight pressure differential. To facilitate catalyst circulation, it is also important to employ substantially the same pressure within the reactor and the regenerator, and this may be accomplished by automatic control of outlet valves 48 and 49 in reaction product and regeneration gas lines, controller 50 being provided for the purpose. When employing separate vessels for the reactor and the regenerator, it is desirable that they be close together and parallel in order to avoid as far as possible the resistance to catalyst flow which would result from horizontal conduits. Transfer of catalyst from the regenerator to the reactor without loss of heat is also facilitated by propinquity.

Although the drawing is not in scale, it should be apparent that the downcomer or standpipe 51 may be of sufficient cross sectional area to permit settling and increase in density of the catalyst in this relatively quiescent zone, without loss of its fluid character, however. Accordingly, the column of catalyst contained in 51 will be enough denser than the catalyst in 46 to provide the desired pressure for circulation of catalyst. Circulation may be controlled by regulating the introduction of steam or other inert gas at 52. In general, zones 46 and 47 are turbulent zones of relatively lower catalyst density than transfer zone 51.

In Figure 2 feed stock is introduced substantially as described in Figure 1 through line 53. Regeneration gas is charged through line 54 and additional stripping steam may be introduced through line 55.

Although the suspension of catalyst in gases containing from 10 to 30 pounds of catalyst per cubic foot is free-flowing and behaves much as a liquid, it effectively resists the diffusion and flow of vapors when in a quiescent zone. Advantage is taken of this fact in the present invention to prevent exchange of vapors between the reactor and the regenerator. The catalyst in the base of converter 13 (Figure 1) and below charge line 19 offers sufficient resistance to seal the lower end of the baffle 15. The passage 17, however, is of sufficient diameter to permit the catalyst to flow freely from one zone to the other.

When operating with catalyst suspensions of low density, it may be desirable to employ a trap or seal at the bottom of division plate 15 and one such seal is shown diagrammatically in Figure 3. In that case the converter 13a may be provided with a substantially flat bottom to which is fastened a pair of baffles 56 and 57 forming a trough about the lower edge of the baffle 15a. Catalyst accumulates in this trough with sufficient density to seal the trough against vapor transfer around the baffle 15a. The catalyst trapped in this trough, however, is kept fluid by the introduction of steam or other aerating gas by line 58 when necessary. The baffles 56 and 57 may be inclined, if desired, to facilitate the flow of catalyst therethrough.

In the modification of my apparatus shown in Figure 5 converter 59, which may be a vertical cylindrical tower, is divided by vertical baffles 60 and 61 in the manner shown to provide therebetween a channel 62 through which catalyst may flow from the upper part of one section of the converter to the lower part of the other section. Deflector 62a serves to prevent hydrocarbon vapors entering the channel 62. A passage 63 is provided at the bottom of the baffle 61 to permit circulation of catalyst between the two sections.

In operation hydrocarbon charge is introduced by line 64 and dispersed in the lower part of the reaction zone 65 where it is contacted with suspended catalyst. Catalyst which falls to the bottom of the reaction zone 65 flows through opening 63 into the regeneration zone 66, where it is regenerated by contact with a stream of air introduced through line 67. The suspension of catalyst in 66 rises above the baffle 61 and flows downward through the channel 62. Inert stripping or sealing gas, steam, etc. may be introduced into the channel 62 if desired and aeration gas may be introduced into channel 63. The flow of catalyst through 62 into 65 may be controlled by a suitable damper if desired. The reaction products are withdrawn from 65 through vapor line 68 while products of regeneration are withdrawn from 66 through outlet 69. Other forms of apparatus may be employed using inclined baffle plates 60 and 61 or other arrangements embodying the main feature of a downward channel conducting catalyst from the upper part of one zone of the reactor-regenerator to a lower part of the other zone, where the catalyst is dispersed, settled and recycled. The baffle 60 may extend to a point below vapor inlet 64 if desired, providing that the lower end is at a point of turbulence from which the catalyst will be rapidly distributed through the reactor.

The baffles 60 and 61 may be curved to allow for expansion stresses and they may also take the form of cylinders, one cylinder extending from the top to a low point in the converter and the other from the bottom to an elevated point within or around the other. An annular space between the cylinder would then form a catalyst conduit corresponding to duct 62.

As indicated hereinabove, one of the advantages of my invention is the feasible use of high catalyst to oil feed ratios. Whereas the prior art employed catalyst ratios of the order of 1 part of catalyst per part of oil to 4 parts of catalyst per part of oil by weight, I may successfully employ catalyst ratios of 5 to 1 up to 50 to 1 and generally of the order of 10 to 1 up to 25 to 1. By using high catalyst ratios of this order, I find it possible to use catalysts of much lower activity and yet obtain high conversion rates of the order of 35 to 60% of gasoline per pass. Furthermore, as mentioned hereinabove, I can avoid the necessity of cooling the regenerator for removal of exothermic regeneration heat, inasmuch as the rapid circulation of catalyst from the exothermic regeneration to the endothermic reaction zones suffices to prevent undue rise of temperature in the regenerator. The regeneration temperatures are, accordingly, not much higher than reaction temperatures and generally I may operate with regeneration temperatures of the order of 25 to 100° or 150° F. above reaction temperatures, while entirely avoiding overheated local areas with consequent catalyst deterioration. The life of the catalyst in my process is, therefore, much longer than that in conventional catalytic conversion processes and catalysts of greater thermal sensitivity may be employed than in conventional processes.

The pressure used in my process is preferably low, for example, atmospheric to 25 or 50 pounds per square inch, generally about 5 to 20 pounds per square inch. In catalytic reforming of naphtha, higher pressures are advantageous, e. g., 100 to 400 pounds per square inch, especially when hydrogen is present. The amount of hydrogen may be about 1 to 5 volumes per volume of naphtha treated and in this operation I prefer to use catalysts of the type of molybdenum or chromium oxide supported on active alumina.

Although I have described my invention by means of specific applications thereof, I intend that it be construed as broadly as the following claims indicate.

I claim:

1. The process of converting hydrocarbons which comprises contacting said hydrocarbons with a dense suspension of a solid conversion catalyst in a reaction zone thereby depositing carbonaceous matter on said catalyst, conducting said dense suspension of catalyst from a low point in said reaction zone directly and substantially without change of pressure to a low point in an adjacent regeneration zone, maintaining said catalyst in dense suspension in said regeneration zone and contacting it therein with oxygenous gas, thereby removing carbonaceous deposits therefrom, returning dense catalyst suspension from a high point in said regeneration zone directly to a low point in said reaction zone in a moving fluid stream under pseudo hydrostatic pressure and maintaining circulation of catalyst suspension between said reaction zone and said regeneration zone thru unimpeded passages solely by the pseudo hydrostatic pressure of the dense catalyst suspension in one of said zones.

2. The process of claim 1 wherein the catalyst flowing from a low point in said reaction zone to a low point in the adjacent regeneration zone is conducted thru a sealing zone substantially preventing the flow of vapor between said reaction zone and said regeneration zone.

3. The process of converting hydrocarbons which comprises contacting said hydrocarbons with a dense suspension of a solid conversion catalyst maintained in free-flowing condition in a reaction zone, thereby depositing carbonaceous matter on said catalyst as a result of the conversion reaction, conducting free-flowing dense catalyst suspension from a low point in said reaction zone directly and substantially without change in pressure to a low point in an adjacent regeneration zone, maintaining substantially the same pressure at the top of said reaction and regeneration zones, maintaining said catalyst in free-flowing dense suspension in said regeneration zone at a higher level than in said reaction zone and contacting it therein with oxygenous gas thereby removing carbonaceous deposits from said catalyst, returning dense catalyst suspension from a high point in said regeneration zone directly to a low point in said reaction zone in a moving fluid stream under pseudo hydrostatic pressure and facilitating the circulation of catalyst between said reaction and regeneration zones by maintaining the suspension of catalyst in said reaction zone at a higher density than the suspension of catalyst in said regeneration zone.

4. The process of converting hydrocarbons which comprises contacting said hydrocarbons with a dense suspension of a solid conversion catalyst maintained in free-flowing condition in a reaction zone, thereby depositing carbonaceous matter on said catalyst as a result of the conversion reaction, conducting free-flowing dense catalyst suspension from a low point in said reaction zone directly and substantially without change in pressure to a low point in an adjacent regeneration zone, maintaining said catalyst in free-flowing dense suspension in said regeneration zone and contacting it therein with oxygenous gas thereby removing carbonaceous deposits from said catalyst, returning dense catalyst suspension from a high point in said regeneration zone directly to a low point in said reaction zone in a moving fluid stream under pseudo hydrostatic pressure and maintaining the pressure at the top of said reaction zone and at the top of said regeneration zone substantially the same by automatically controlling the flow of vapors and gases leaving one of said zones in response to the pressure at the top of the other zone.

5. In the process of converting hydrocarbon oils wherein heavy hydrocarbon oil is contacted at conversion temperature with a solid conversion catalyst maintained in dense turbulent suspension in a reaction zone, the product vapors are separated from the catalyst and the catalyst is transferred to an adjacent regeneration zone on about the same level with said reaction zone wherein said catalyst is maintained in dense suspension and is continuously regenerated by combustion with an oxygenous gas after which it is separated from spent regeneration gases and recycled in dense suspension to said reaction zone, the improvement comprising increasing the rate of circulation of catalyst between said reaction zone and said regeneration zone by directly interconnecting the base of said reaction zone and the base of said regeneration zone to provide for substantial equalization of pressure and insure free flow of dense catalyst suspension therebetween, conducting said dense catalyst suspension in a free-flowing confined, fluid stream from a high level in one zone to a low level in the other zone, and, by controlled settling, maintaining the average density of the catalyst in said stream above the average density of the catalyst in the zone from which it was withdrawn, thereby providing the pressure differential required to circulate the catalyst suspension between the said zones.

6. The process of claim 5 wherein an inert gas is introduced at a low point of said confined stream in an amount sufficient to control the density of catalyst therein and thereby regulate the rate of circulation of said catalyst in said system.

EVERETT A. JOHNSON.

REFERENCES CITED

The following references are of record in the file of this patent:

UNITED STATES PATENTS

| Number | Name | Date |
|---|---|---|
| 2,013,973 | Scharff et al. | Sept. 10, 1935 |
| 2,253,486 | Belchetz | Aug. 19, 1941 |
| 2,270,913 | Venema | Jan. 27, 1942 |
| 2,271,148 | Becker et al. | Jan. 27, 1942 |
| 2,284,603 | Belchetz | May 26, 1942 |
| 2,296,722 | Marancik et al. | Sept. 22, 1942 |
| 2,302,209 | Goddin, Jr. | Nov. 17, 1942 |
| 2,303,047 | Hemminger | Nov. 24, 1942 |
| 2,304,128 | Thomas | Dec. 8, 1942 |